United States Patent [19]
Louzecky

[11] 3,887,311
[45] June 3, 1975

[54] ROTARY MACHINE APEX SEAL
[75] Inventor: Paul J. Louzecky, Troy, Mich.
[73] Assignee: General Motors Corporation, Detroit, Mich.
[22] Filed: Mar. 28, 1974
[21] Appl. No.: 455,564

[52] U.S. Cl. ............... 418/113; 418/61; 418/123
[51] Int. Cl. ............................................ F01c 19/02
[58] Field of Search .............. 418/113, 122–124, 418/61

[56] References Cited
UNITED STATES PATENTS

| | | | |
|---|---|---|---|
| 3,127,095 | 3/1964 | Froede | 418/122 |
| 3,194,488 | 7/1965 | Fuhrmann | 418/113 |
| 3,323,498 | 6/1967 | Kraic et al. | 418/122 |
| 3,551,080 | 12/1970 | Feller | 418/124 |
| 3,758,243 | 9/1973 | Fox, Jr. | 418/124 |
| 3,832,104 | 8/1974 | Lamm | 418/113 |

FOREIGN PATENTS OR APPLICATIONS

| | | | |
|---|---|---|---|
| 1,003,626 | 9/1965 | United Kingdom | 418/125 |
| 1,004,088 | 9/1965 | United Kingdom | 418/113 |
| 1,325,131 | 3/1963 | France | 418/113 |

*Primary Examiner*—C. J. Husar
*Attorney, Agent, or Firm*—Ronald L. Phillips

[57] ABSTRACT

A rotary machine having a multi-lobed internal peripheral wall and a multi-apex rotor wherein an apex seal mounted at each apex on the rotor has an outwardly facing convex sealing surface sealingly contacting the peripheral wall wherein the sealing surface has two end portions with radii substantially equal to the radius of the peripheral wall at maximum apex seal angle and a center portion tangent to the end portions with a radius determined by the oversize of the peripheral wall relative to a certain generated curve.

3 Claims, 7 Drawing Figures

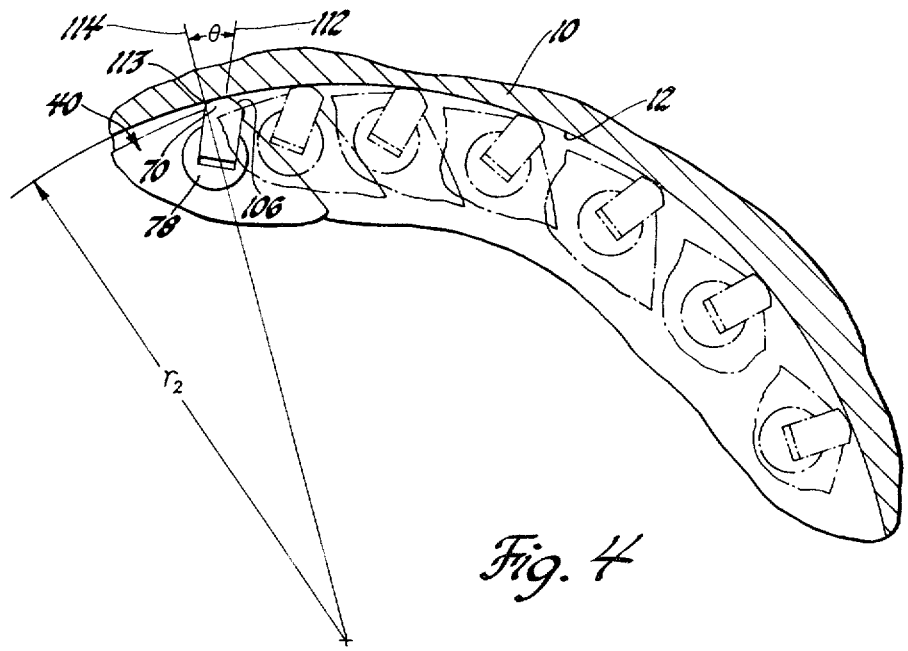
Fig. 4
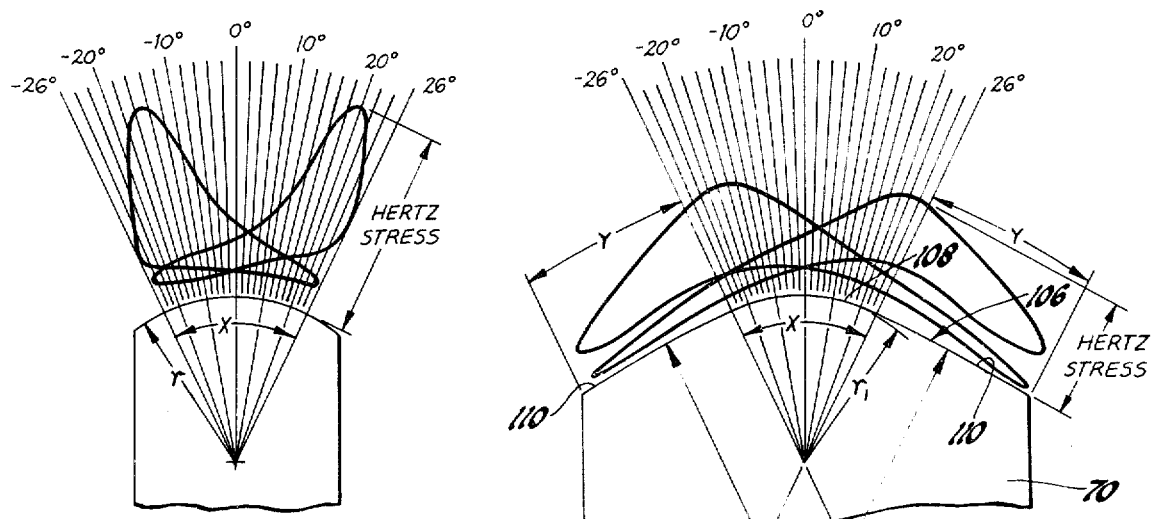
Fig. 5 PRIOR ART
Fig. 6
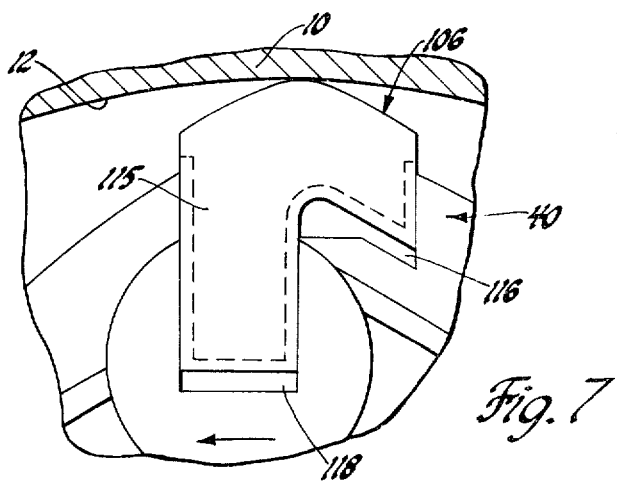
Fig. 7

ROTARY MACHINE APEX SEAL

This invention relates to a rotary machine apex seal and more particularly to the sealing surface shape of such apex seal.

In presently commercial rotary combustion engines, the apex seals on the rotor have a circular surface that sealingly contacts the engine's internal peripheral wall. This wall conforms to the envelope of the family of circular surfaces of the apex seals that is developed with rotor rotation so that the apex seals are not required to move radially to maintain contact with the peripheral wall as the rotor rotates. As a result, wear is spread over a substantial portion of the width of the apex seals instead of occurring in only a narrow region thereof and radial seal movement is only required to take up normal seal wear in addition to whatever cyclic apex seal movements occur as a result of manufacturing tolerances and engine operating conditions. While such an arrangement has proven satisfactory, there is a continuing effort to reduce apex seal and housing wear and improve seal operation.

I have found that in the presently commercial round sealing surface type of apex seal there is a very high dynamic seal load (Hertz stress) along the curved sealing surface which results from localized load concentration corner rubbing. Furthermore, I have found that the highest stress or loading range occurs near the corners when the apex seal is at maximum angle to the peripheral wall. Compared with a rotary combustion spark ignition engine, this loading condition is more severe in a rotary combustion diesel engine which has much higher gas loads acting on the apex seal. Recognizing that apex seal wear is related to seal load and rubbing velocity and since the velocity is established by engine speed and peripheral wall size, I have changed the loading pattern on the apex seal to reduce its wear. This is accomplished by providing the apex seals with an outwardly facing convex sealing surface having a double radius. In my design the sealing surface has a nose or center portion which extends through an arc equal to the range of varying apex seal angle and has a typical or normal radius equal to the oversize dimension of the peripheral wall relative to an epitrochoidal closed curve. The sealing surface further has end portions on either side of and tangent to the center portion which extend through arcs approximately equal to that of the center portion and have radii approximately equal to the radius of curvature of the peripheral wall at the maximum apex seal angle. As a result, the apex seal according to the present invention has substantially reduced load over its extended sealing surface.

Besides reducing the dynamic seal load, my apex seal design has other advantages such as the capability of being made of an abradable material that will slowly wear away. With the softer seal material, the wear can be adjusted for the life of the engine. Furthermore, my apex seal sealing surface has a very large effective working width such that it spans a number of the chatter marks which are typically unavoidably machined into the peripheral wall and thus is not excited as readily as a narrow seal. These chatter marks can then be considered beneficial for holding oil to aid lubrication of the apex seals. Furthermore, the double radius of my apex sealing surface tends to scrape off less oil from the peripheral wall with the wedging action of the seal like in a bearing encouraging the seal to ski over the surface. This wedging action also encourages the air next to the peripheral wall to help act as an air lubricant for the seal. In addition, the reduced seal load also reduces the normal scuffing action of this type of seal on the peripheral wall and because the seal has a very substantial width, the scuffing is even less pronounced. In addition to machined chatter marks in the peripheral wall, my apex seal because of being so wide and spanning a number of chatter marks does not tend to produce chatter marks as readily as a narrow seal and even if it does they will be less abrupt and more like a gentle wave. Also because of the better load distribution across the sealing surface, the amplitude of the chatter marks will be much less with time and these marks because of their lower frequency will not tend to substantially adversely affect the structural integrity of the apex seal or peripheral wall. Also because of the lower seal load, my apex seal will run cooler which has the effect of reducing wear while retaining strength.

An object of the present invention is to provide a new and improved rotary machine apex seal.

Another object is to provide in a rotary machine an apex seal having an outwardly facing convex sealing surface contacting a peripheral wall wherein the sealing surface has a center portion having a radius determined by the peripheral wall along its length and end portions contiguous with the center portion having radii determined by the radius of curvature of the peripheral wall at maximum apex seal angle.

Another object is to provide in a rotary machine an apex seal mounted on each rotor apex having an outwardly facing convex sealing surface contacting the machine's peripheral wall wherein the sealing surface has a center portion having a radius substantially equal to the oversize dimension of the peripheral wall relative to a generated curve and end portions tangent to the center portion having radii substantially equal to the radius of curvature of the peripheral wall at maximum apex seal angle.

These and other objects of the present invention will be more apparent with reference to the following description and drawing in which:

FIG. 4 shows the changing apex seal angle at sequential rotor positions.

FIG. 5 is an enlarged end view of a conventional apex seal and its dynamic loading.

FIG. 6 is an enlarged end view to the same scale as FIG. 5 of the apex seal and its dynamic loading according to the present invention.

FIG. 7 is an enlarged end view of another embodiment of the apex seal according to the present invention.

Figure 1:
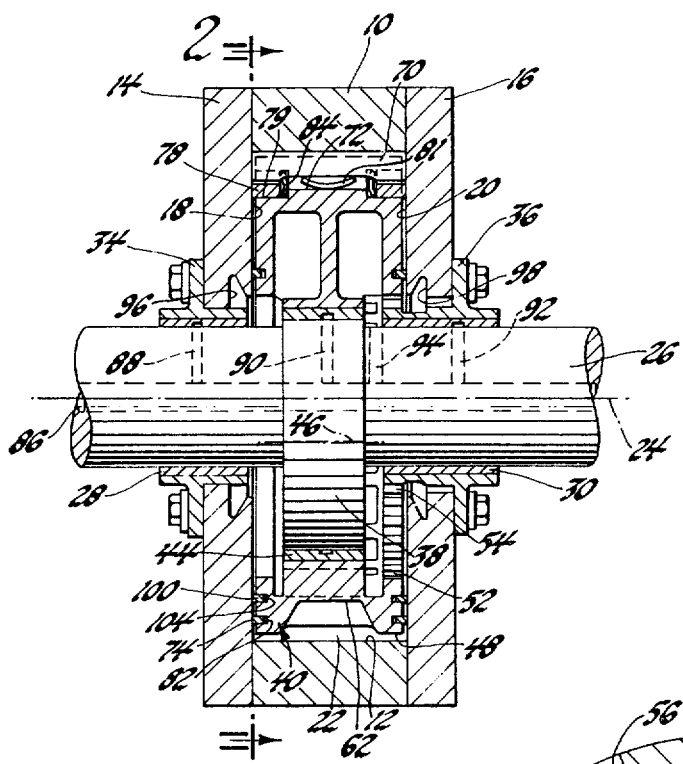
FIG. 1 is a longitudinal sectional view of a rotary combustion engine having apex seals according to the present invention.
Figure 2:
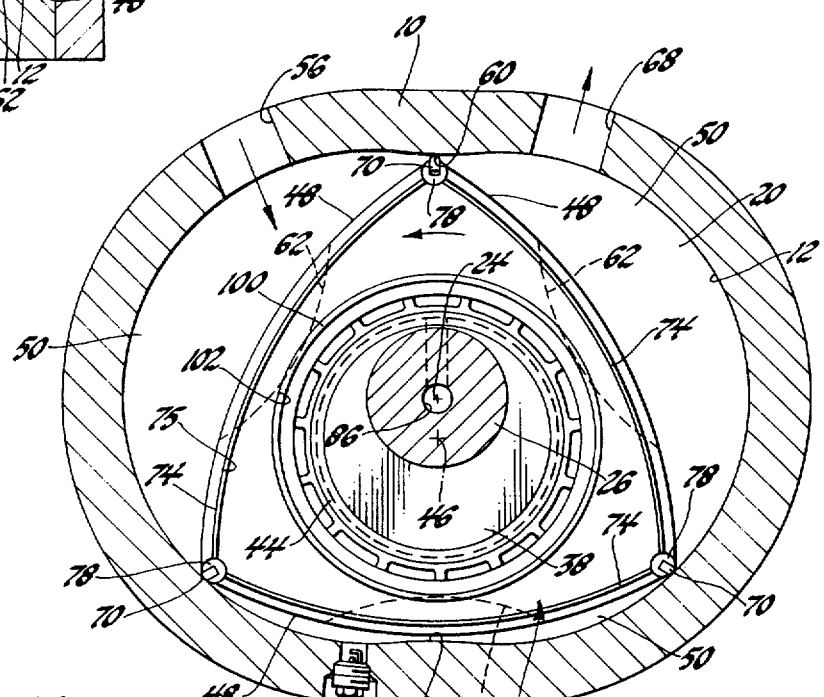
FIG. 2 is a transverse view of the rotary machine taken along the line 2—2 in FIG. 1.

The apex seal according to the present invention is for use in an internal combustion rotary engine of the type shown in FIGS. 1 and 2. This engine generally comprises a rotor housing 10 having an inwardly facing inner peripheral wall 12 and a pair of end housings 14 and 16 having parallel, oppositely facing, inner end walls 18 and 20, respectively. The housing parts are rigidly secured together by bolts, not shown, and the inner housing walls 12, 18 and 20 cooperatively provide a cavity 22. Referring to FIG. 2, the peripheral wall 12 is a two-lobe curve with a center line indicated at 24 and will be described in more detail later. A crankshaft 26 extends through the cavity 22 and is rotatably supported in sleeve bearings 28 and 30 which are secured in collars 34 and 36 that are bolted to the end housings 14 and 16, respectively, as shown in FIG. 1, the crankshaft axis being coincident with the center line 24, parallel to the peripheral wall 12 and perpendicular to the end walls 18 and 20. The crankshaft 26 is provided in the cavity 22 with an eccentric 38. A three-lobe rotor 40 has a hub with a sleeve bearing 44 journaled on the eccentric 38 whereby the rotor 40 is supported for rotation about the eccentric's center line 46 which is thus the rotor's axis. The rotor 40 has the general shape of a triangle with three radially outwardly facing convex peripheral flanks or faces 48 which face the peripheral wall 12 and cooperate therewith and also with the end walls 18 and 20 to define three variable volume working chambers 50 that are spaced around the rotor and move with the rotor within the housing as the rotor rotates about its axis 46 while planetating with respect to the crankshaft axis 24.

With the two-lobe peripheral wall 12 and the three-lobe rotor 40, each of the working chambers 50 sequentially expands and contracts between minimum and maximum volume during each rotor revolution in fixed relation to the housing by forcing the rotor 40 to rotate at one-third the speed of the crankshaft 26. This is accomplished by gearing comprising an internal tooth gear 52 which is concentric and integral with the rotor 40. The gear 52 meshes with an external tooth gear 54 which is received with clearance about and is concentric with the crankshaft 26 and is made stationary by being formed integral with the right-hand collar 36 as shown in FIG. 1. The gear 52 has one and one-half times the number of teeth as the gear 54 to provide the required speed ratio of 3:1 between the crankshaft 26 and the rotor 40.

A combustible air-fuel mixture from a suitable carburetor arrangement, not shown, is made available to each working chamber 50 by an intake passage 56, as shown in FIG. 2, which extends through the rotor housing 10 and opens to the cavity through the peripheral wall 12 on the leading side of cusp 60 of this wall relative to the direction of rotor rotation indicated by the arrow in FIG. 2. A single channel or recess 62 is provided in the center of each chamber face 48 of the rotor 40 to provide for the transfer of working gases past the peripheral wall's other cusp 64 when a rotor is at or near its top-dead-center position, as shown in FIG. 2, so that the chambers are not divided by the cusp 64 at the time when combustion is to occur therein. A spark plug 66 is mounted in the rotor housing 10 adjacent the cusp 64 with its spark gap exposed to the working chambers. As the rotor 40 planetates, the working chambers successively draw in fuel mixture as the rotor faces pass the intake passage. The fuel mixture is then trapped in each working chamber and compressed and when the rotor face of this chamber is in the vicinity of top-dead-center, this mixture is ignited at the completion of the compression phase, there being provided a suitable ignition system, not shown, for applying voltage to plug 66 at the proper time. Upon ignition of the mixture in each working chamber the peripheral wall 12 takes the reaction forcing the rotor 40 to continue its motion while the gas is expanding. The leading rotor apex of each working chamber eventually traverses an exhaust passage 68 on the trailing side of cusp 60 whereby the exhaust products are then expelled through this exhaust passage to complete the cycle.

Sealing of the chambers 50 for such four-cycle operation is provided by three apex seals 70 which are each mounted in an axially extending radially outwardly facing slot 72 that is located at each apex or corner of the rotor 40 and extends the width thereof. Three arcuate side seals 74 are mounted in axially outwardly facing slots 75 in each rotor side and extend adjacent the rotor faces between two apex seals 70. Three cylindrical corner seals 78 are mounted in cylindrical holes 79 in each rotor side with each corner seal providing sealing between the adjacent ends of two side seals and one apex seal as shown in FIG. 2. Referring to FIG. 1, each of the apex seals 70 is biased by a spring 81 to continuously engage the peripheral wall 12 and each of the side seals 74 and corner seals 78 is biased to continuously engage the respective end walls 18 and 20 by a wave spring 82 and a C-shape spring 84, respectively.

Describing now the lubrication and rotor cooling that is normally provided in such an arrangement, oil from the engine drains to a sump from which it is delivered by a suitable engine powered pump to an axial oil passage 86 in the crankshaft 26 as shown in FIG. 1. Radial oil passages 88, 90 and 92 deliver oil from the passage 86 to lubricate the sleeve bearings 28, 44 and 30, respectively. The rotor 40 is hollow and is webbed for rigidity and a radial oil passage 94 in the crankshaft 26 delivers oil from the passage 86 to the rotor's interior for cooling of the rotor with the oil carrying the heat from the rotor by passing to annular cavities 96 and 98 in the respective end walls 18 and 20 that are connected to drain to the sump. In addition to the gas seals carried on the rotor 40, there is provided in each side of the rotor a circular oil seal 100 that is located radially inwardly of the side gas seals 74 in an axially outwardly facing circular groove 102. The oil seals 100 are each biased by a wave spring 104 to continuously engage the respective end walls 18 and 20 to prevent the oil supplied for lubrication and cooling from reaching the radially outwardly located gas seals.

Figure 3:
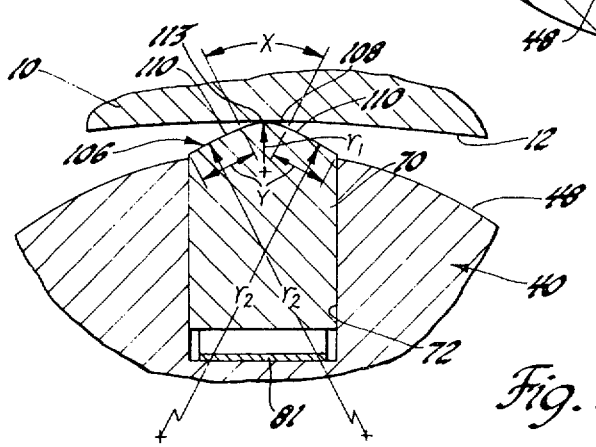
FIG. 3 is an enlarged end view of the apex seal according to the present invention.

In such rotary machines it is present commercial practice, as shown in FIG. 5, for the apex seals to have a circular sealing surface with a constant radius $r$ and for the two-lobed peripheral wall not to be a true epitrochoid and instead a closed curve that is parallel thereto and is spaced outward therefrom a uniform distance measured along lines normal to each curve equal to the radius $r$ of the apex seals' circular sealing surface. This dimension is commonly called the peripheral wall's "oversize." As a result, the line contact of the apex seals' circular sealing surface with the peripheral wall moves along a substantial portion of the width of the apex seal as the rotor rotates and the angle of the apex seal relative to the peripheral wall changes and the apex seal is not required to move radially to maintain such moving line contact. This type of apex seal and peripheral wall construction is disclosed in Wankel U.S. Pat. No. 2,988,008 to which reference may be made for a more detailed description. While such prior art apex seal and peripheral wall design has proven generally satisfactory, I have found it possible to substantially reduce the dynamic loading all along the apex seal's sealing surface to obtain all the attendant advantages with only slight modifications to the apex seal that are readily manufacturable. Briefly, these modifications, as best shown in FIGS. 3, 4 and 6, comprise providing the apex seals 70 with an outwardly facing convex sealing surface 106 having a nose or center portion 108 of substantially normal arc X with a radium $r_1$ equal to the peripheral wall's oversize. In addition, the sealing surface 106 has end portions 110 extending beyond either side of the center portion with radii $r_2$ approximately equal to the radius of curvature of the peripheral wall 12 when the apex seal is subjected to its greatest load which occurs near maximum apex seal angle. With the modified sealing surface 106 wherein the end portions have arcs Y substantially equal to the center portion's arc X, the apex seals are still not required to move to any substantial degree while the moving line contact is now maintained along this double radius sealing surface over a substantially larger distance as the angle $\theta$ of the apex seal changes. As shown in FIG. 4, the angle $\theta$ of the apex seal varies as the apex seal travels or slides around the peripheral wall 12 and is the angle between the radial plane 112 through the rotor axis 46 and the associated rotor apex and the plane 114 perpendicular to the line of tangency to the peripheral wall at the line of sealing contact 113. It is believed that a full understanding of the present invention and its advantages is provided by comparing its geometry with the present commercial type.

With the conventional round sealing surface apex seal there occurs very high dynamic loading (Hertz stress) at the seal corners and along the curved surface as shown in FIG. 5, this high loading being due to the localized load concentration corner rubbing. The formula for Hertz stress maximum in compression on the apex seal used in finding the dynamic loading shown in FIGS. 5 and 6 is $$\max S_c = .798 X \sqrt{\frac{\frac{P(D_1 - D_2)}{(D_1 \times D_2)}}{\left[\frac{1 - V_1^2}{E_1} + \frac{1 - V_2^2}{E_2}\right]}}$$

where $$P = \frac{\text{Combined gas load + centrifugal force acting on seal at angle } \theta}{\text{Length of seal}} \quad (\#/\text{inch})$$

$D_1$ = Peripheral wall diameter at sealing line contact (inches)
$D_2$ = Apex seal diameter (inches)
   = $2r$ in prior art
   = $2r_1$ or $2r_2$ in present invention dependent on $\theta$
$V_1$ = Poisson's ratio of peripheral wall
$E_1$ = Modulus of elasticity of peripheral wall (lbs.-/inch$^2$)
$V_2$ = Poisson's ratio of apex seal
$E_2$ = Modulus of elasticity of apex seal (lbs./inch$^2$)

As shown in FIGS. 5 and 6, in one practical rotary engine arrangement of this type the apex seal angle $\theta$ was found to change from normal to about ±26° while the load on the seal varies from a minimum (with only the seal spring force acting) up to a maximum load at about ±20° near the corners with an intermediate load at ±26° occurring at the corners (with the combined force of the firing pressure plus the centrifugal force on the seal). For some illustrative values, the loading on the typical round sealing surface apex seal in an actual rotary combustion spark ignition engine was found to produce a maximum Hertz stress of about 30,000 to 40,000 psi depending upon the combined gas and centrifugal force acting on the seal. The maximum Hertz stress on the typical round sealing surface seal in a rotary combustion diesel engine was found to be considerably higher, about 45,000 to 60,000 psi due to the increase in engine firing pressure. With such high Hertz stress, it is difficult to make the lubrication of the apex seals effective since the seal motion combined with this high dynamic loading tends to rupture the oil film on the peripheral wall that is provided to reduce seal wear and friction, such oil film being typically obtained on the peripheral wall by mixing oil with the fuel or by direct surface oiling. Furthermore, while theoretically the apex seal with the conventional round sealing surface with a radius equal to the peripheral wall oversize is not required to move, actual radial seal movement does occur. For example, actual radial seal movement in several commercial engines was found to average 0.008 inch total with a low of 0.004 inch and a high of 0.015 inch. Then as the seal wears, the radial seal movement becomes greater and tends to induce chatter of the peripheral wall.

With the double radius sealing surface 106 of the present invention under the same operating conditions, the dynamic loading is extended over a much larger width or area of the apex seal for the same apex seal angle change while the high stresses along the sealing surface are substantially reduced with the peak and end loads approximately halved as can be seen by comparing the invention as illustrated in FIG. 6 with the prior art in FIG. 5. This has been accomplished by the much larger radius $r_2$ of the end portions 110 causing the sealing contact line 113 to move along the sealing surface 106 past the normal nose portion 108 with its oversize radius $r_1$ with such extention or spread of the sealing contact line which occurs at or near the maximum apex seal angle causing slight radial adjustment of the apex seal but substantially no greater than that encountered on normal wear of the conventional round sealing surface apex seal. As a result, my sealing surface 106 immediately experiences relatively low Hertz stress with its original shape for initial satisfactory operation rather than letting high loads on a less suited shape of sealing surface cause quick wearing and other adverse affects on the seal.

The apex seal 70 with the sealing surface 106 according to the present invention may also have the form of an L-shape section with a metal reinforcing shell 115, as shown in FIG. 7, to reduce the weight while also providing two gas loading cavities 116 and 118 instead of one underneath the seal. In this arrangement, the cavities are at different depths relative to the working chambers and as a result the shallow cavity 116 loads up with the gas quickly while the deeper cavity 118 takes a little longer which has the effect of giving the apex seal more loading stability. Furthermore, the blowdown of the gas in the deeper cavity 118 is slower and as a result provides damping which is effective to reduce seal vibration and "pop-back."

The above described embodiment is illustrative of the invention which may be modified within the scope of the appended claims.

I claim:

1. A rotary machine having an internal peripheral wall and oppositely facing side walls coooperatively defining a cavity, said peripheral wall defined by a curve that is parallel to and spaced outwardly a predetermined oversize dimension from a multi-lobed generated closed curve, a crankshaft having an eccentric in said cavity, a multi-lobe rotor rotatably mounted on said eccentric, said rotor having a plurality of apexes that remain adjacent said peripheral wall as said rotor and said crankshaft rotate, said rotor having peripheral faces extending between pairs of said apexes that cooperate with said cavity walls to define a plurality of working chambers that vary in volume and move with said rotor, an apex seal mounted at each said apex on said rotor having an outwardly facing convex sealing surface that has moving line contact with said peripheral wall as said rotor and said crankshaft rotate for sealingly separating adjacent working chambers, each said sealing surface symmetrical to a radial plane through the axis of said rotor and the associated rotor apex that determines an apex seal angle with respect to a plane perpendicular to the line of tangency to said peripheral wall at the line of sealing contact, said apex seal angle varying between ± a maximum apex seal angle as said rotor and said crankshaft rotate, each said sealing surface having two identical end portions contiguous with a center portion located therebetween, said center portion centered on the radial plane through the associated rotor apex and having a constant radius of curvature substantially equal to said oversize dimension, and said end portions located at identical angular locations either side of the radial plane through the associated rotor apex and tangent to said center portion and having constant radii of curvature substantially equal to the radius of curvature of said peripheral wall at said maximum apex seal angle.

2. A rotary machine having an internal peripheral wall and oppositely facing side walls cooperatively defining a cavity, said peripheral wall defined by a curve that is parallel to and spaced outwardly a predetermined oversize dimension from a two-lobed epitrochoidal closed curve, a crankshaft having an eccentric in said cavity, a three-lobe rotor rotatably mounted on said eccentric, said rotor having three apexes that remain adjacent said peripheral wall as said rotor and said crankshaft rotate, said rotor having three peripheral faces extending between pairs of said apexes that cooperate with said cavity walls to define three working chambers that vary in volume and move with said rotor, an apex seal mounted at each said apex on said rotor having an outwardly facing convex sealing surface that has moving line contact with said peripheral wall as said rotor and said crankshaft rotate for sealingly separating adjacent working chambers, each said sealing surface symmetrical to a radial plane through the axis of said rotor and the associated rotor apex that determines an apex seal angle with respect to a plane perpendicular to the line of tangency to said peripheral wall at the line of sealing contact, said apex seal angle varying between ± a maximum apex seal angle as said rotor and said crankshaft rotate, each said sealing surface having two identical end portions contiugous with a center portion located therebetween, said center portion centered on the radial plane through the associated rotor apex and having a constant radius of curvature substantially equal to said oversize dimension, said end portions located at identical angular locations either side of the radial plane through the associated rotor apex and tangent to said center portion and having constant radii of curvature substantially equal to the radius of curvature of said peripheral wall at said maximum apex seal angle, said center portion extending through an arc substantially equal to the range of said changing apex seal angle, and said end portions extending through equal arcs over the remaining width of said apex seal.

3. A rotary machine having an internal peripheral wall and oppositely facing side walls cooperatively defining a cavity, said peripheral wall defined by a curve that is parallel to and spaced outwardly a predetermined oversize dimension from a two-lobed epitrochoidal closed curve, a crankshaft having an eccentric in said cavity, a three-lobe rotor rotatably mounted on said eccentric, said rotor having three apexes that remain adjacent said peripheral wall as said rotor and said crankshaft rotate, said rotor having three peripheral faces extending between pairs of said apexes that cooperate with said cavity walls to define three working chambers that vary in volume and move with said rotor, an apex seal mounted at each said apex on said rotor having an outwardly facing convex sealing surface that has moving line contact with said peripheral wall as said rotor and said crankshaft rotate for sealingly separating adjacent working chambers, each said sealing surface symmetrical to a radial plane through the axis of said rotor and the associated rotor apex that determines an apex seal angle with respect to a plane perpendicular to the line of tangency to said peripheral wall at the line of sealing contact, said apex seal angle varying between ± a maximum apex seal angle as said rotor and said crankshaft rotate, each said sealing surface having two identical end portions contiguous with a center portion located therebetween, said center portion centered on the radial plane through the associated rotor apex and having a constant radius of curvature substantially equal to said oversize dimension, said end portions located at identical angular locations either side of the radial plane through the associated rotor apex and tangent to said center portion and having constant radii of curvature substantially equal to the radius of curvature of said peripheral wall at said maximum apex seal angle, said center portion extending through an arc substantially equal to the range of said varying apex seal angle, and said end portions extending through arcs substantially equal to that of said center portion.

* * * * *